(12) United States Patent
Schweitzer et al.

(10) Patent No.: US 6,487,764 B1
(45) Date of Patent: Dec. 3, 2002

(54) METHOD OF MAKING A STEEL CABLE REINFORCED CONVEYOR BELT

(75) Inventors: David Paul Schweitzer, North Canton, OH (US); Thomas Goodsell Hutchins, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/555,729

(22) PCT Filed: Feb. 3, 1998

(86) PCT No.: PCT/US98/01932

§ 371 (c)(1),
(2), (4) Date: Jun. 1, 2000

(87) PCT Pub. No.: WO99/39898

PCT Pub. Date: Aug. 12, 1999

(51) Int. Cl.[7] .................. G01M 19/00; B29D 29/06
(52) U.S. Cl. ................ 29/407.07; 264/401; 264/229; 156/64; 156/137; 156/161; 156/179; 73/862.41
(58) Field of Search .............. 29/407.05, 407.07; 264/401, 229; 156/64, 137, 161, 179; 73/862.41

(56) References Cited

U.S. PATENT DOCUMENTS

| | | | |
|---|---|---|---|
| 3,394,587 A | 7/1968 | Freeman | 73/143 |
| 3,862,559 A | 1/1975 | Richter et al. | 72/205 |
| 3,871,217 A | 3/1975 | Miley | 73/143 |
| 4,570,118 A * | 2/1986 | Tomczak et al. | |

FOREIGN PATENT DOCUMENTS

| | | | |
|---|---|---|---|
| DE | 20 55 456 | 5/1972 | B29H/9/04 |
| EP | 0 785 420 | 7/1997 | G01L/5/10 |

* cited by examiner

*Primary Examiner*—P. W. Echols
(74) *Attorney, Agent, or Firm*—Marc R Dion, Sr.

(57) ABSTRACT

This invention relates to a method of making a steel cable reinforced conveyor belt while monitoring the tensions of all the cables.

2 Claims, No Drawings

METHOD OF MAKING A STEEL CABLE REINFORCED CONVEYOR BELT

BACKGROUND

When making steel cable reinforced conveyor belts, it is desirable to maintain the tensions on each cable at a predetermined level. This invention provides a method of making a steel cable reinforced conveyor belt while monitoring the tension of each of the cables going into the construction.

Methods and apparatuses for measuring the tension in wires and cables have been known for some time. Most are based on determining the natural frequency of vibration of a known length of cable between two fixed points and calculating the tension according to the following formula:

$$T=4L^2F^2M$$

where T is tension, L is the length between the two fixed points, F is the natural frequency of vibration and M is the mass per unit of length of the cable. See e.g. U.S. Pat. Nos. 3,871,217; 3,540,271; 3,394,587; 2,618,970 and 3,889,525.

In accordance with the practice of the present invention, there is provided a method of making a steel cable reinforced conveyor belt comprising the steps of encapsulating a plurality of steel cables between two layers of rubber while monitoring the tensions of all the cables by exciting a known length of each cable between a pair of clamps and measuring their natural frequencies by means of a combination of a permanent magnet and a linear Hall effect sensor in close proximity to each of the cables, sending the output signals from the sensors to a signal converter to convert the signal from analog to digital then to a digital signal processor to generate a signal for the period of each cable and sending the period data to a host computer to calculate the tension of each cable. The data from the last computer can then be fed back to adjust the tension of each cable.

The excitation of the cables is brought about by moving the cables away from their rest position and then allowing them to vibrate. As the cables vibrate near the permanent magnet/linear Hall effect sensor combinations which are in a non-contact proximity to each cable, the sensors sense the changes in the magnetic flux and their output signals vary as the positions of the cables change. The periods of the sensors' outputs are detected and converted from analog to digital by means of a comparator circuit. Sets of thirty-two digital signals are read in parallel by a digital signal processor (DSP) at a regular rate prescribed by an internal DSP timer and interrupt.

A time counter is incremented by one with each interrupt. A time stamp (value of the counter) is saved in the DSP memory for each channel each time the digital signal for that channel transitions low to high. Time stamps are collected in the DSP memory under interrupts long enough for at least one cable cycle to be detected. The time stamps are converted to periods.

The integer period values are sent to the host computer. The host knows the time interval for each time counter increment so that the period in seconds can be determined and the tensions are then calculated.

What is claimed is:

1. A method of making a steel cable reinforced conveyor belt comprising the steps of encapsulating a plurality of steel cables between two layers of rubber while monitoring the tensions of all the cables by exciting a known length of each cable between a pair of clamps and measuring their natural frequencies by means of a combination of a permanent magnet and a linear Hall effect sensor in close proximity to each of the cables, sending the output signals from the sensors to a signal converter to convert the signal from analog to digital then to a digital signal processor to generate a signal for the period of each cable and sending the period data to a host computer to calculate the tension of each cable.

2. The method of claim 1 further including the step of adjusting the tension of each cable.

* * * * *